Jan. 31, 1956  J. STRANGE  2,733,083
FASTENING DEVICES FOR SHAFT KNOBS
Filed Jan. 30, 1952
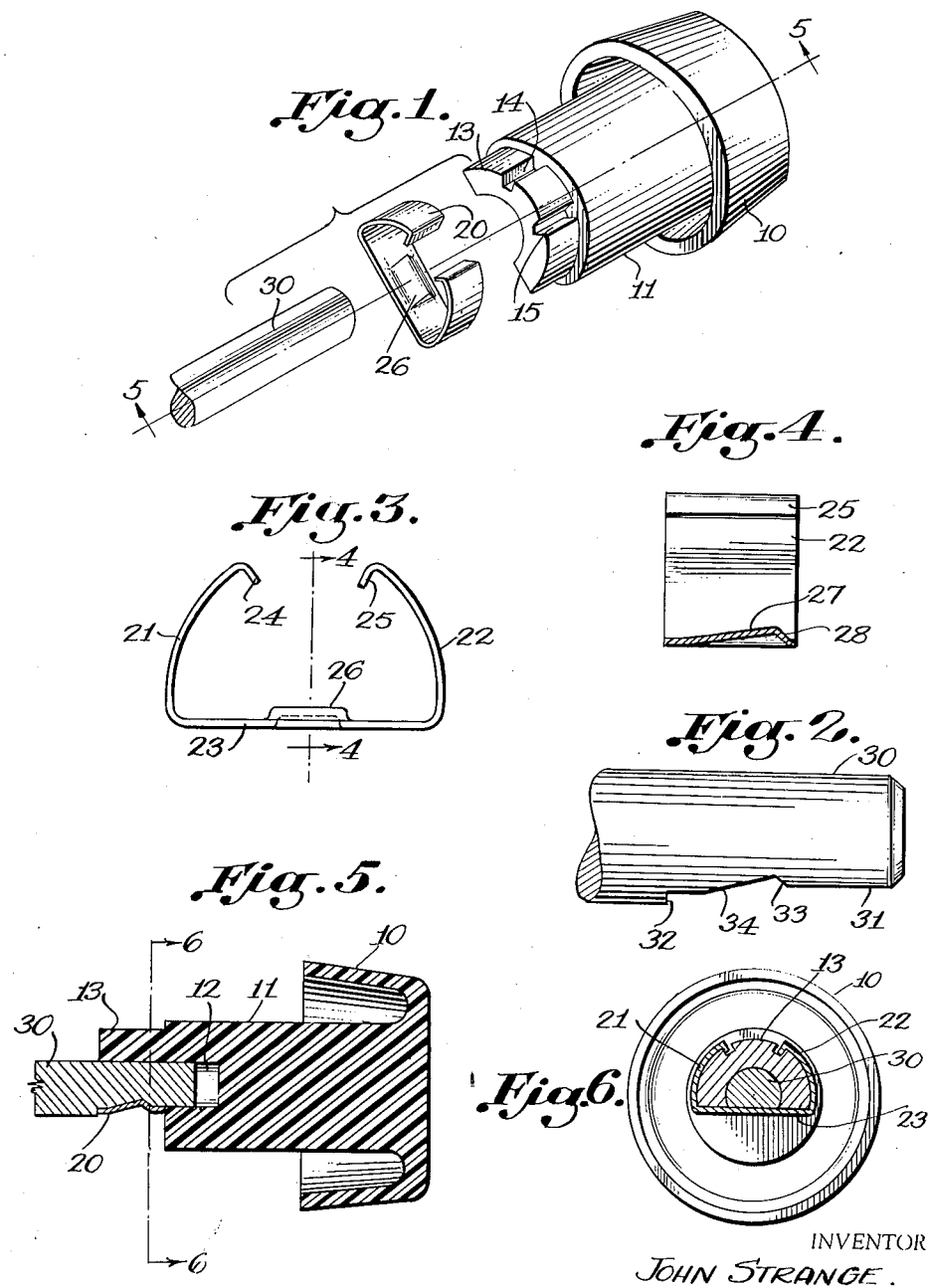
INVENTOR
JOHN STRANGE.
BY Bates, Teare & McBean
ATTORNEY

United States Patent Office 2,733,083
Patented Jan. 31, 1956

2,733,083

FASTENING DEVICES FOR SHAFT KNOBS

John Strange, Cardiff, Wales, assignor to Tinnerman Products Inc., Cleveland, Ohio, a corporation of Ohio Application January 30, 1952, Serial No. 269,021

7 Claims. (Cl. 287—53)

This invention relates to a fastening device and more particularly to a fastening device for detachably securing a male and female member together in interlocking engagement.

Various types of fastening devices and assemblies have been devised for securing male and female members together in interlocking engagement. In many cases it is desirable to detachably secure such male and female members together by means of a fastening device whose securing action may be overcome by means of a removal force which may be greater in amount or different in direction than the securing force. This invention is directed to improvements in the type of fastening device wherein the detaching or removal force is greater in amount than the securing force.

An exemplary application of such a fastening device relates to the detachable connection of a knob or a handle to a rotatable shaft as in radio and other electrical apparatus. It is sometimes desirable that the removal force required to detach a knob or handle from such a shaft should be substantially greater than the incidental removal force exerted during normal operation of the knob or handle to prevent inadvertent separation from the shaft.

Accordingly, it is an object of this invention to provide an improved construction for a fastening device which will require a greater removal force to separate a female member from a male member than may be incidentally exerted during normal usage.

It is a further object of this invention to provide a rotatable axial assembly of a male and female member which includes an interlocking fastening device construction that will act as a rotating coupling member and will allow separation of the male and female members by the application of an increased axial separating force beyond that applied in normal usage.

Briefly, in accordance with the preferred embodiment of this invention, there is provided a fastening device in the form of a strip of metal having its ends turned inwardly toward each other to form an intermediate portion therebetween and wherein each end portion is hooked at its extremity for interlocking engagement with cooperating means on the peripheral surface of a female member to form an extension of a recess therein. The intermediate portion of the strip has a resilient protuberance adapted to cooperate between a male member having a complementary indentation corresponding to such protuberance and the female member to resiliently secure them together. Where the male member is a rotatable shaft, the fastening device acts as a coupling whereby the shaft may be rotated by the female member. In either case, a greater axial separating force is required to separate the female member from the male member than is normally exerted thereon in normal usage.

In the drawings,

Fig. 1 is a perspective view showing a fastening device in extended relation between a knob and shaft.

Fig. 2 is a partial view of the shaft showing the end configuration.

Fig. 3 is a full view of the fastening member.

Fig. 4 is a cross-sectional view of the fastening member taken along the lines 4—4 in Fig. 3.

Fig. 5 is a cross-sectional view taken along the lines 5—5 in Fig. 1 to illustrate the fastening device in assembled relation between the knob and shaft.

Fig. 6 is a cross-sectional view taken along the line 6—6 in Fig. 5 of the drawings.

Referring now to Fig. 1 of the drawings, which illustrates one preferred form of the assembly, there is shown a knob 10 which may be made of plastic or other suitable material and which has an axial extension 11 with an axial extension 11 with an axial end recess 12 and an integral segmental hub 13. The segmental hub 13 is in the form of a segmental extension of the axial knob extension 11 and is substantially semi-circular in cross-section so that it overhangs the axial recess 12. The outer peripheral portion of the hub 13 has radially spaced, axially extending recesses 14 and 15 opening into the flat face of the outer portion of the hub 13 for receiving interlocking portions of a resilient fastening device 20 as will be hereinafter more fully described.

The fastening device 20 is formed from a strip of metal having its ends turned inwardly towards each other to form a pair of resilient prongs 21 and 22 interconnected by an intermediate strip portion 23 of the metal strip. In the preferred form illustrated, the prongs 21 and 22 are curved toward each other in the shape of a segment of a circle to conform to the semi-circular peripheral surface of the hub 13 which they are intended to enclose. Each prong has an inturned end at its extremity forming opposed hook portions 24 and 25 on the corresponding prongs for engagement with the axial recesses 14 and 15 on the hub 13.

The intermediate strip portion 23 of the metal strip is provided with a protuberance 26 which gradually rises toward the free hooked ends of the prongs and transversely of the metal strip portion 23 from one edge towards the other edge as shown at 27 and then drops abruptly towards the other edge as best shown at 28 in Fig. 4 of the drawings.

Referring again to Fig. 1, a shaft 30 is provided for axial insertion through the fastening device 20 and hub 13 into the axial recess 12 of the axial knob extension 11. As best shown in Fig. 2 of the drawings, the shaft 30 is provided with a free end portion from which a segment is axially cut to provide a flat, axially extending, segmental face 31 forming a shoulder 32 with the outer periphery of the shaft 30. The flat face 31 of the shaft 30 is transversely recessed in spaced relation from the end of the shaft 30 to provide an oblique and transversely extending shoulder 33 having a slope corresponding to the abrupt slope 28 of the protuberance 26 of the fastening device 20. The transverse recess also provides a pilot shoulder 34 having a slope extending in the opposite axial direction from the abrupt shoulder 33 and which corresponds to the gradual pilot slope 27 of the protuberance 26 on the fastening device 20.

As best shown in Fig. 5 of the drawings, the free end portion of the shaft 30 extends in tight-fitting engagement within the axial recess 12 of the connecting hub 13 and the flat axial face 31 of the shaft 30 protrudes slightly beyond the flat side face 16 of the hub 13 into the axial recess 12 of the knob extension 11. The axial knob recess 12 is preferably formed to have a cross-section complementary to the inserted end of the shaft 30. It is readily apparent that with the fastening device 20 embracing the periphery of the connecting hub 13 with its prongs 21 and 22 and with the intermediate portion 23 underlying the hub 13 to form an extension of the axial recess 12, the shaft 30 may be connected to the knob or handle 10 by inserting the recessed end portion of the shaft 30 through the extension of the axial recess 12 formed by the fastening device 20 and hub 13 into the axial recess 12 of the knob extension 11. The shaft 30 first engages the pilot portion 27 of the protuberance 26 on the fastening device 20 to gradually and resiliently bow such pilot portion outwardly and then, with further insertion of the shaft 30 into the axial recess 12, the shoulders 33 and 34 of the shaft 30 snap into engagement with the complementary portions 27 and 28 of the protuberance 26 to provide a very pronounced resistance to axial withdrawal of the shaft 30. As previously indicated, the fastening device 20 also assists in coupling the knob 10 to the shaft 30 for rotation by means of the interlocking engagement between the fastening device 20 and the knob 10 through prongs 21 and 22, and the interlocking engagement between the protuberance 26 and the complementary recessed end of the shaft 30.

It will be understood that the angle of slope of the shoulders 33 and 34 on the shaft 30 and of the protuberance 26 on the fastening device 20 may be varied as desired to vary the resistance to axial withdrawal of the shaft and that the fastening device 20 and the cooperating hub 13 may take other forms than those illustrated and described herein without detracting from the basic teaching. In the preferred form illustrated in the drawings, it was found that an angle of slope for the shoulder portion 33 on shaft 30 and the complementary portion 28 of the protuberance 26 on the fastening device 20 of 45° provided the desired axial resistance to removal of knob 10 from the shaft 30. An angle of slope of approximately 8° for the pilot portion 34 on the shaft 30 and the complementary portion 27 of the protuberance 26 of the fastening device 20 was determined to be suitable for easy connection of the shaft 30 with the knob 10. It is readily apparent from the foregoing that the cooperating restraining shoulders 33 and 28 of the shaft 30 and fastening device 20 respectively may in one extreme be made square to provide a positively locked assembly.

While I have shown and described what I consider to be a preferred form of my invention, along with suggestions of modified forms, it will be obvious to those skilled in the art that other changes and modifications, particularly with respect to the individual construction of the male and female members, and the fastening device, may be made without departing from the scope of my invention as defined by the appended claims.

I claim:

1. A fastening device for detachably securing a male member within a female member comprising, a strip of semi-rigid material having its ends bent to bow in the same direction about an intermediate strip portion therebetween, the extremity of each end portion being turned inwardly toward said other end portion and terminating short thereof to form a space therebetween, said intermediate strip portion rising transversely and gradually from one edge thereof towards said end portions' extremities and dropping abruptly into the other edge to form a gradually sloping transverse pilot shoulder and an abrupt oppositely facing retaining shoulder thereon.

2. A fastening device for detachably securing a male member within a female member comprising, a strip of semi-rigid material having its ends bent inwardly to extend in substantially the same direction from an intermediate strip portion therebetween, the extremity of each end portion being turned inwardly to form opposed hooks thereon, and said intermediate strip portion having a transverse protuberance rising gradually in the direction of said end portions from one edge and dropping abruptly into the other edge to form a gradually sloping resilient pilot surface and an oppositely directed abrupt retaining surface thereon.

3. A fastening device for detachably securing a male member within a female member comprising, a flat strip of metal having each end bent inwardly along an arc to converge toward each other and forming an integral flat strip portion therebetween, each end portion having its extremities turned inwardly to form a hooked portion extending downwardly at an oblique angle towards a common plane between said end portions and defining a space therebetween, said integral flat strip portion intermediate said end portions having a transverse protuberance rising gradually toward the hooked extremities of said end portions from one edge to form a gradually sloping resilient pilot shoulder and dropping abruptly into the other edge to form an oppositely directed abrupt retaining shoulder thereon.

4. In a fastening assembly for detachably securing a male member within a female member, the combination of a female member having an axial recess and a segmental hub extension overhanging said recess, a male member having one end extending into said axial recess and having a transverse recess spaced from said one end in the external surface opposite the hub extension, said transverse recess forming an abrupt facing out shoulder from the axial recess and an oppositely facing pilot shoulder of gradual slope, a fastener member having a pair of resilient prongs extending in the same direction from a segmental intermediate portion, said prongs resiliently embracing said overhanging hub with the intermediate segmental portion underlying said hub and said male member to form with said hub an extension of the axial recess, said intermediate segmental portion having a transverse protuberance complementary in form with the transverse recess in said male member for resiliently interlocking therewith when said male member is inserted through the extended axial recess to detachably secure the male member therein.

5. In fastening assembly for detachably secured a male member within a female member, the combination of a female member having an axial recess in one end and a segmental hub extension overhanging said recess, a male member having one end extending into said axial recess and having a transverse recess spaced from said end in the external surface opposite the hub extension, said transverse recess forming an abrupt shoulder facing out from the axial recess and an oppositely extending pilot shoulder of gradual slope, a fastening member formed from a strip of semi-rigid material with hooked prongs extending in substantially the same direction from an intermediate strip portion, said prongs resiliently embracing said overhanging hub with the intermediate portion underlying said hub and said male member to form with the hub an extension of the axial recess, said intermediate strip portion having a transverse protuberance rising in the same direction as the hooked prongs to form a gradually sloping shoulder and an oppositely directed abrupt shoulder complementary with the shoulders formed by the transverse recess in said male member and adapted for interlocking engagement therewith consequent upon the insertion of said male member through the extended axial recess therein.

6. In a fastening assembly for detachably securing a male member within a female member, the combination of a female member having an axial recess and a segmental hub extension overhanging said recess, said segmental hub having circumferentially spaced axial recesses in its external peripheral surface, a male member having one end extending through said segmental hub into said axial recess and having a transverse recess spaced from said one end in the external surface opposite the hub extension, said transverse recess forming an abrupt shoulder adjacent said end and a pilot shoulder of gradual slope rising axially in the opposite direction, a metal fastening member having an intermediate strip portion with a pair of integral prongs resiliently extending in the same direction from each end thereof, each of said prongs having hooked extremities embracing said segmental hub with the intermediate strip portion underlying said hub and male member to form an extension of the axial recess and with the hooked extremities engaging a corresponding axial recess in the external hub periphery, and said intermediate strip portion having a transverse protuberance rising toward said prongs and complementary in form with the transverse recess in said male member to resiliently interlock therewith when said male member is inserted through said extended axial recess to detachably secure the male member therein.

7. In a knob and rotatable shaft assembly adapted to be detachably secured together against axial displacement, a fastening device having spaced prongs with hooked extremities each extending substantially in the same direction from an opposite end of an intermediate portion having a gradually rising transverse pilot surface and an opposed transverse abrupt retaining surface, said knob having an axial recess with a segmental hub extension overhanging said recess and embraced by said prongs, said hub having circumferentially spaced axial recesses in its outer peripheral surface for receiving the hooked extremities of said prongs, the intermediate portion of said fastening device forming an extension of the knob axial recess by underlying the segmental hub extension, said rotatable shaft having one end extending through the extended axial recess and having an axial segment of its surface removed from said one end to form an axially extending segmental flat surface overlying the intermediate portion of the fastening device, a groove extending transversely across the flat segmental surface of said shaft, said groove forming an abrupt oblique shoulder with said surface adjacent the end of the shaft for interlocking engagement with the corresponding surface on the intermediate portion of said fastening device, and said groove forming a pilot shoulder rising gradually in the opposite axial direction for sliding engagement with the corresponding pilot surface on the intermediate portion of said fastening device.

References Cited in the file of this patent

UNITED STATES PATENTS

| | | |
|---|---|---|
| 457,860 | Barnes | Aug. 18, 1891 |
| 710,862 | Hammond et al. | Oct. 7, 1902 |
| 1,954,062 | Walter | Apr. 10, 1934 |
| 2,112,247 | McLaughlin | Mar. 29, 1938 |
| 2,216,219 | Wiley | Oct. 1, 1940 |
| 2,252,855 | Lasch | Aug. 19, 1941 |
| 2,291,995 | Tinnerman | Aug. 4, 1942 |
| 2,300,746 | Phillips | Nov. 3, 1942 |
| 2,600,980 | Eyre | June 17, 1952 |